United States Patent
Copella et al.

[11] Patent Number: 5,216,229
[45] Date of Patent: Jun. 1, 1993

[54] VERIFIABLE OBJECT HAVING INCREMENTAL KEY

[75] Inventors: Robert A. Copella, Northbrook; Kevin J. Pease, Glenview, both of Ill.

[73] Assignee: Rand McNally & Company, Chicago, Ill.

[21] Appl. No.: 623,513

[22] Filed: Dec. 7, 1990

Related U.S. Application Data

[63] Continuation-in-part of Ser. No. 361,946, Jun. 5, 1989, Pat. No. 4,985,614.

[51] Int. Cl.$^5$ .............................................. G06K 7/00
[52] U.S. Cl. .................................... 235/440; 235/380; 235/437; 235/448; 235/449
[58] Field of Search ............... 235/380, 437, 440, 448, 235/493

[56] References Cited

U.S. PATENT DOCUMENTS

| | | |
|---|---|---|
| 3,599,153 | 8/1971 | Lewis et al. . |
| 3,636,318 | 1/1972 | Lindstrom et al. . |
| 3,790,754 | 2/1974 | Black et al. . |
| 3,894,756 | 7/1975 | Ward . |
| 3,959,630 | 5/1976 | Hogberg . |
| 4,034,211 | 7/1977 | Horst et al. . |
| 4,066,910 | 1/1978 | Swift . |
| 4,092,526 | 5/1978 | Beck . |
| 4,094,452 | 6/1978 | Moschner . |
| 4,114,032 | 9/1978 | Brosow et al. . |
| 4,215,812 | 8/1980 | Chancel . |
| 4,218,674 | 8/1980 | Brosow et al. . |
| 4,303,949 | 12/1981 | Peronnet . |
| 4,423,415 | 12/1983 | Goldman . |
| 4,450,348 | 5/1984 | Stockburger et al. . |
| 4,469,937 | 9/1984 | Stockburger et al. . |
| 4,476,468 | 10/1984 | Goldman .................. 235/468 |
| 4,620,727 | 11/1986 | Stockburger et al. . |
| 4,630,845 | 12/1986 | Sanner . |
| 4,649,265 | 3/1987 | Stockburger et al. . |
| 4,661,983 | 4/1987 | Knop . |
| 4,806,740 | 2/1989 | Gold et al. . |

FOREIGN PATENT DOCUMENTS

| | | |
|---|---|---|
| 2829778C2 | 8/1985 | Fed. Rep. of Germany . |
| 529398 | 11/1972 | Switzerland . |
| 569333 | 11/1975 | Switzerland . |
| 1308331 | 2/1973 | United Kingdom . |
| 1331604 | 9/1973 | United Kingdom . |
| 1546053 | 1/1977 | United Kingdom . |
| 1535340 | 12/1978 | United Kingdom . |
| 1541579 | 3/1979 | United Kingdom . |

Primary Examiner—Harold Pitts
Attorney, Agent, or Firm—Dressler, Goldsmith, Shore, Sutker & Milnamow, Ltd.

[57] ABSTRACT

An object verification system generates an incremental verification key which can be carried on the object co-extensive with the region of the associated randomly varying characteristic. The incremental key can be formed by measuring values of the characteristic and comparing selected pairs of values. The algebraic sign of the comparison can be used as an indicium for creating a verification key distributable across the region of the object. Alternately, the magnitude of the difference between the selected pairs of values can be also be included in some or all of the indicia.

84 Claims, 10 Drawing Sheets

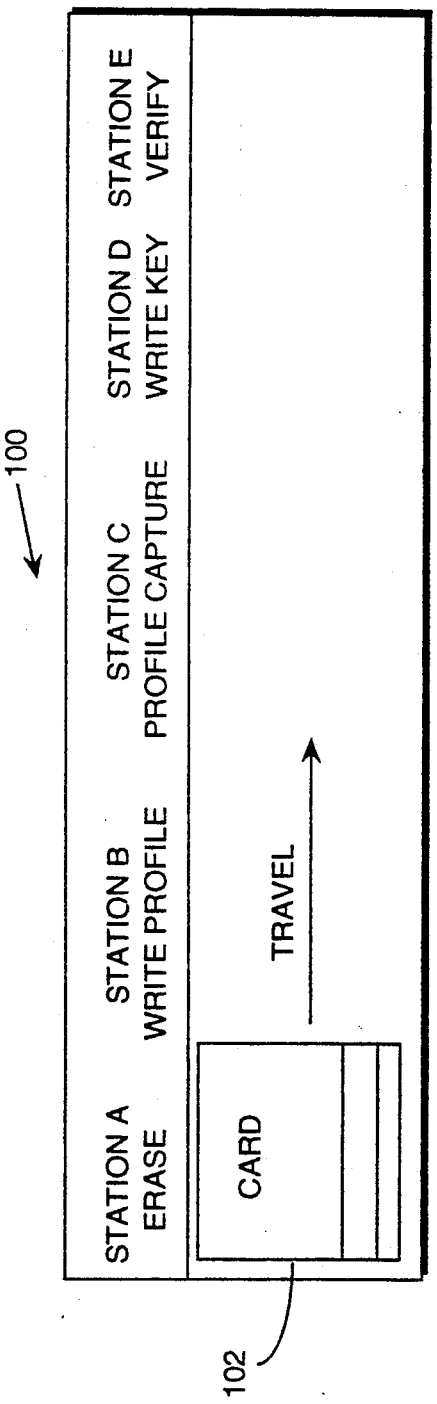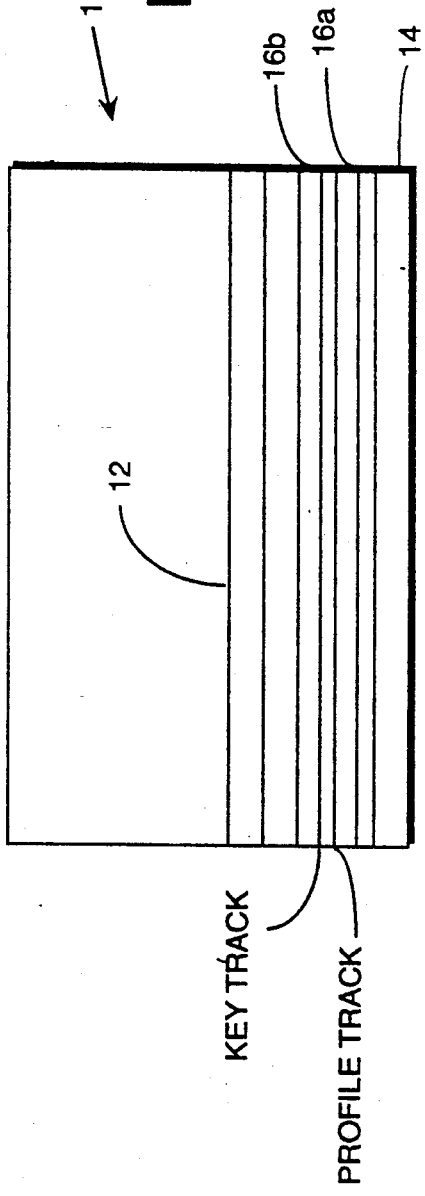

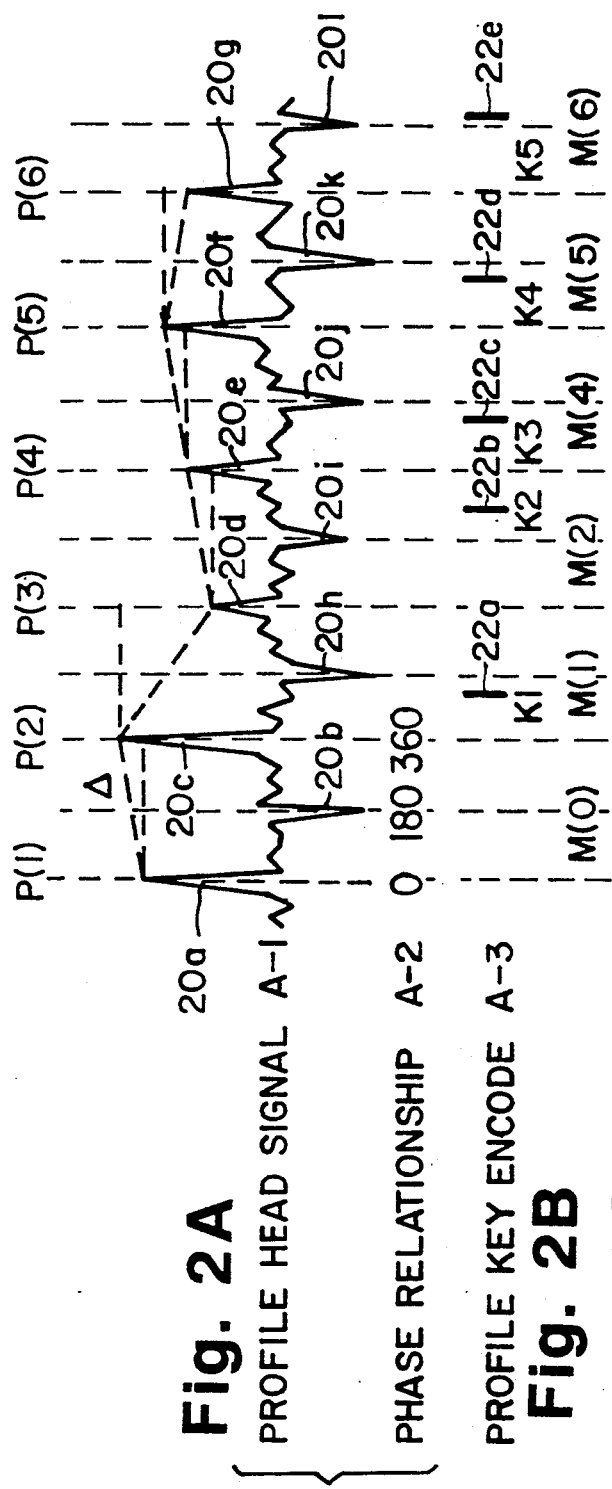

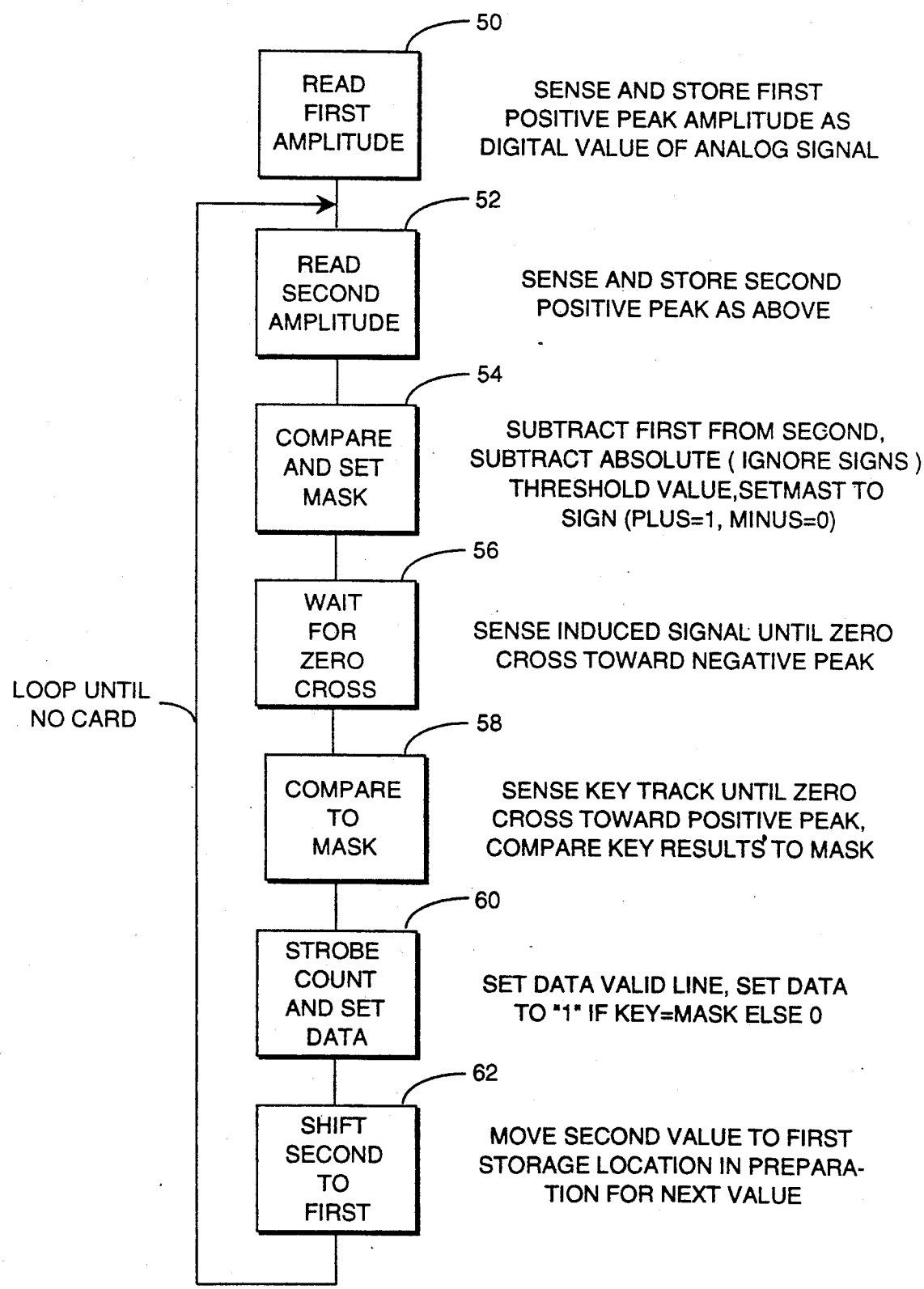

ENCODE PROCESS

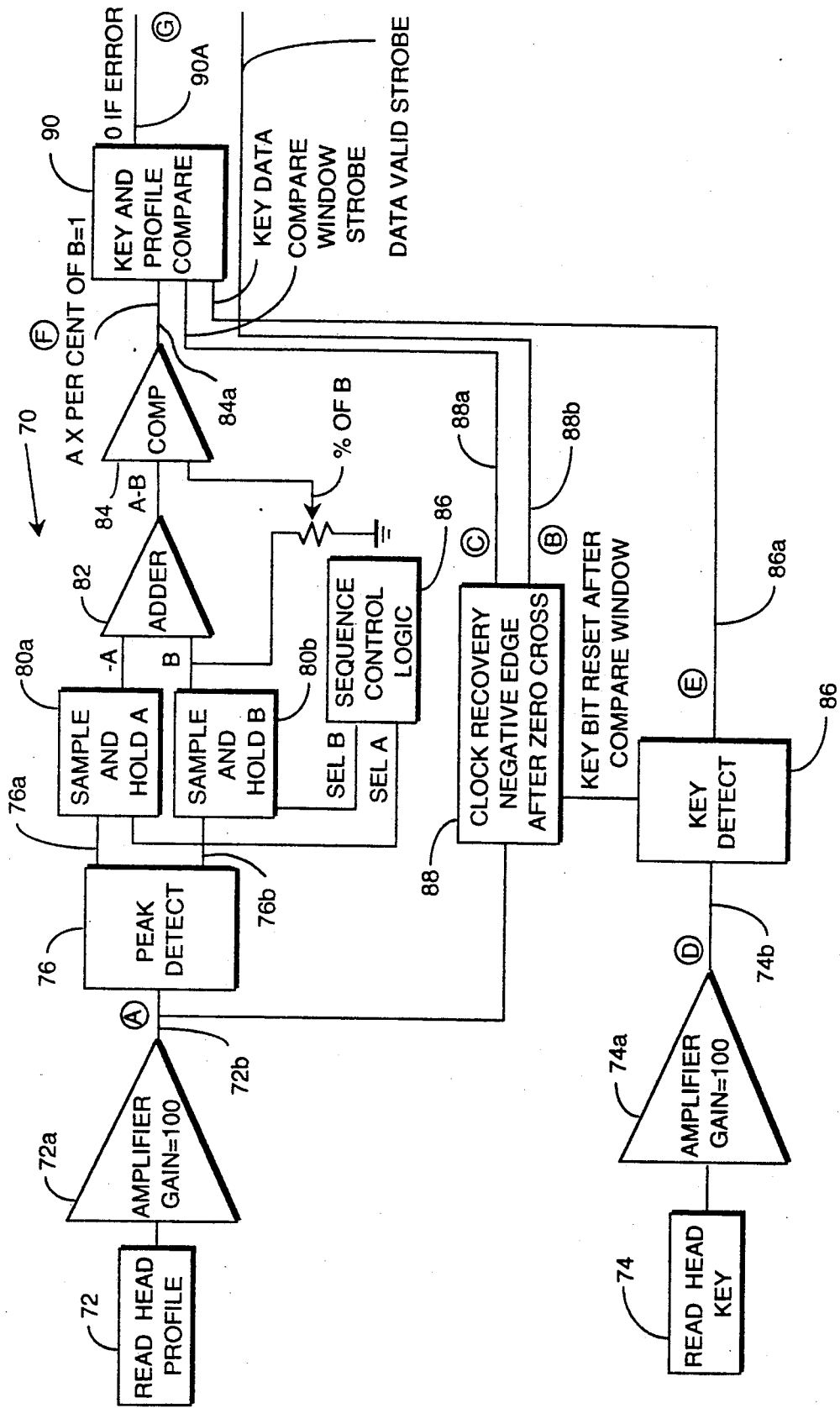
Fig. 7  CARD READ CIRCUIT BLOCK DIAGRAM

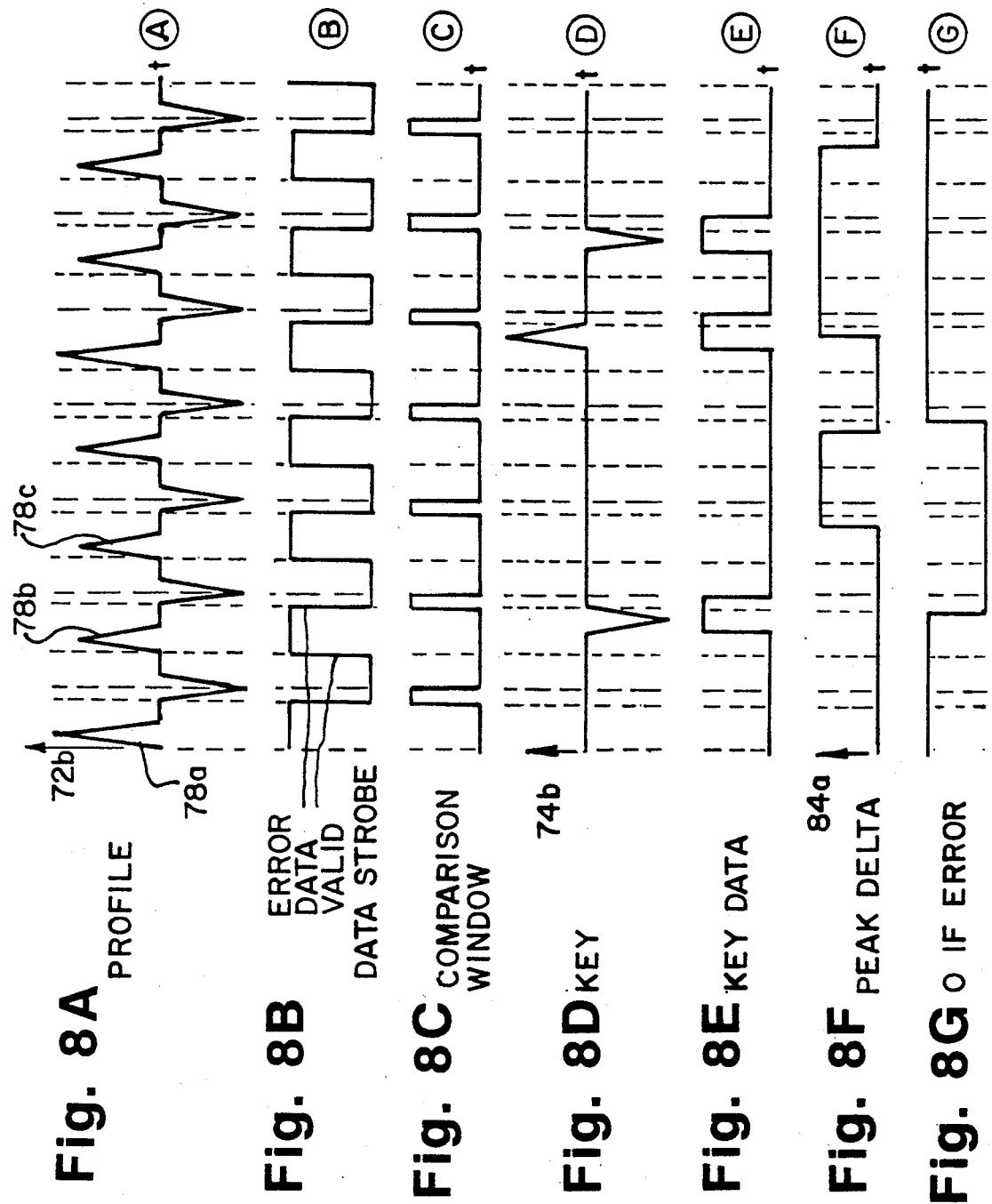

VERIFIABLE OBJECT HAVING INCREMENTAL KEY

This is a continuation-in-part of Copella Pat. Applic. Ser. No. 361,946 filed June 5, 1989 now U.S. Pat. No. 4,985,614 entitled "Object Verification Apparatus and Method" and incorporated herein by reference.

FIELD OF THE INVENTION

The invention pertains to objects whose authenticity can be verified. More particularly, the invention pertains to both documents and other types of objects which carry a magnetic region. The magnetic region can be used to verify the authenticity of the document or other object.

BACKGROUND OF THE INVENTION

Problems associated with the forgery or counterfeiting of various types of documents are long standing and well known. For example, forgery of transportation tickets, negotiable instruments, currency or other documents of value is a continuing and ongoing problem to issuers of such documents.

The widespread use of plastic credit or debit cards has created, yet, another set of authentication and verification problems. It is very common for such cards to include pre-recorded magnetic stripes which include transaction related information. This information can include account numbers, credit limits and/or personal identification codes.

However, such cards have been especially susceptible to forgery in view of the fact that the magnetic encoding is almost always based on one or more publicly known standards. One such standard, ANSI 4.16-1983 is utilized in connection with many pre-recorded magnetic stripes associated with such cards.

Multi-use transportation documents present yet another type of authentication problem. Such documents are magnetically alterable at the time of use to decrease the remaining value of the card. However, if an original, unused document can be both physically and magnetically duplicated to create a useable counterfeit document, the issuing agency can loose substantial proceeds.

Various systems are known which can be utilized to create and authenticate verifiable documents or credit cards. Some of the known systems are magnetically based. Other are optically based.

One known type of system is disclosed in U.S. Pat. No. 4,837,426 to Pease et al. entitled "Object Verification Apparatus And Method" which is assigned to the Assignee of the present invention. The disclosure and figures of the Pease et al. patent are hereby incorporated herein by reference.

In the system of the Pease et al. patent, a randomly varying magnetic character is measured and used to create a verification key which can be carried on the document. The verification key of the Pease et al. system is a result of processing sensed values of the random magnetic characteristic and creating a single key for the entire document.

A different magnetically based security system is disclosed in U.S. Pat. No. 4,806,740 to Gold et al. entitled "Magnetic Characteristic Identification System". As in the case of the Pease et al. system, the system of the Gold et al. patent creates a verification key for the document which can be carried thereon.

Optically based security systems are disclosed in U.S. Pat. No. 4,423,415 to Goldman entitled "Noncounterfeitable Document System". In one embodiment disclosed in the Goldman system, the translucency of a region of a document is utilized as the measured randomly varying characteristic. Alternately, the Goldman patent also discloses the use of reflectivity for the same purpose. Whether translucency or reflectance are utilized, the system of the Goldman patent also creates a single verification key for a given document.

While known systems appear to be effective with respect to verification of certain types of objects, in each instance, the verification key created for an object is the result of processing measured characteristic values over a region of the object. From these measured and processed characteristic values, a verification key is generated for the entire region and hence the object.

There are times where it would be desirable to be able to verify the authenticity of only a portion of the object. The known systems, need to have the entire region of the random characteristic available. As a result, the known systems are unable to determine if a portion of a document is in fact authentic.

Hence, there continues to be a need for authentication/verification systems of more general applicability then has previously been known. Preferably, such systems would be usable to properly authenticate a portion of an object. In addition, preferably such systems would be readily usable with magnetically based randomly varying characteristics as well as optically based characteristics.

SUMMARY OF THE INVENTION

Methods and devices are provided for creating and verifying objects utilizing a randomly varying characteristic carried thereon. The characteristic itself can take a variety of forms. It may be magnetic, it may be the translucency of a region of the object or alternately, reflectivity of a region of the object.

The values of a parameter of the random characteristic are sensed. The sensed values are then processed.

The processing involves comparing or subtracting pairs of parameter values and determining an algebraic sign of the result. If the sign is positive, for example, an indicium thereof can be recorded on the object. Negative signs need not be recorded.

The process can then be repeated for the next pair of parameter values until the region of the randomly variable characteristic ends. This process forms an incremental or distributed key.

The various indicia can be recorded on the object, at or about the time of the processing step. Thus, when the end of the region of the random characteristic has been reached, the object carries a plurality of spaced-apart indicia which represent an incremental profile thereof.

One of the important advantages of the above-described incremental verification profile is that it can be used to verify the authenticity of a portion of an object. This profile or key is carried along a region of the object which can be coextensive with the region of the randomly variable characteristic of the object.

If the object is torn into two pieces such that both pieces carry a part of the random characteristic and a part of the incremental verification key then one or both of those pieces can be verified using the portion of the region and the key carried thereon.

As an alternate to merely recording the algebraic sign of the results of a comparison or difference between the two parameter values, an indicium of the magnitude of that difference can also be recorded along with the sign. This provides a more complex incremental verification key with a resultant higher level of security.

The magnitude of the difference can be encrypted before being recorded on the document. Alternately, the key can be stored, not on the object, but at a remote location.

An apparatus for validating an object which carries an incremental verification key includes a reader or sensor for sensing the values of a parameter of the random characteristic. As these values are sensed, differences between pairs of values are formed. The result of the difference can be a magnitude along with an algebraic sign or only the algebraic sign by itself.

Simultaneously, the indicia corresponding to the incremental key are also being sensed or read off of the object by a suitable sensor or reader. The apparatus also includes control circuitry for comparing the newly formed incremental indicium with the corresponding incremental indicium read off of the object.

When the end of the randomly variable characteristic has been reached, the apparatus will contain a number corresponding to the number of matches which have been detected between the newly created incremental verification key and the corresponding indicia carried on the object. The apparatus will also contain the total number of newly formed elements of the verification key which have resulted from the most recent pass of the document over the read heads or sensors.

The ratio of these two numbers is a measure of the authenticity of the document. For a perfect document, the value of this ratio should be one. For real documents, the value may be a decimal less than one. By establishing a threshold, the required number of matches to arrive a decision that the document is authentic can be increased or decreased.

In one embodiment of the invention, the random characteristic can be that of a magnetic region carried by the object. To enhance the readability or detectability of values of the random characteristic of the magnetic region, a discontinuous electrical signal can be saturation recorded thereon. For example, a square wave can be saturation recorded onto a part of the magnetic region.

The flux changes associated with the previously recorded square wave when passed through a readhead and converted to voltages can be measured. Peak values can be used, as described previously, to form pairs of amplitude values from which amplitude differences can be formed.

The amplitude differences can be formed using only positive going pulses, for example. The negative going pulses can be used as clock pulses to determine where each incremental indicium, corresponding to a difference in a specific pair of amplitude values, should be recorded on the object. The plurality of indicia can be recorded in a portion of the same magnetic region or it can be printed on the object and read optically.

In a similar fashion, a clock track can be created on a magnetic region which is coextensive with a region of translucency or reflectivity of the object for the purpose of measuring an optically based random characteristic.

Each of the incremental verification indicia can be recorded on the object displaced from a respective base line an amount proportional to the difference between the respective pair of values of the random characteristic. The direction of displacement can identify whether the difference has a positive or a negative sign.

In alternate embodiments, the random characteristic can be that of translucency or reflectance of a document or article. The particular type of random characteristic is not a limitation of the invention.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIG. 1 is a fragmentary, enlarged, planar, schematic view of a verifiable document usable with the present invention;

FIG. 2A is a graph illustrating electrical signals as a function of time read from the profile track of the document of FIG. 1;

FIG. 2B is a schematic timing diagram illustrating recorded incremental key elements relative to down going pulses of the graph of FIG. 2a;

FIGS. 4A, 4B, and 4C taken together are a set of graphs illustrating wave forms generated by the verification apparatus of FIG. 3;

FIG. 5 is a flow diagram of a method of validation of a document or a card carrying a security system in accordance with the present invention;

FIG. 7 is a block diagram schematic of a digital circuit for reading a random characteristic off of a card or an object and comparing that characteristic to a prewritten incremental key;

FIGS. 8A–8G taken together are graphs of a plurality of wave forms from the circuit of FIG. 7 as a function of time;

FIG. 9 is a schematic representation of an apparatus for encoding a card or other object.

DETAILED DESCRIPTION OF THE PREFERRED EMBODIMENTS

Figure 3:
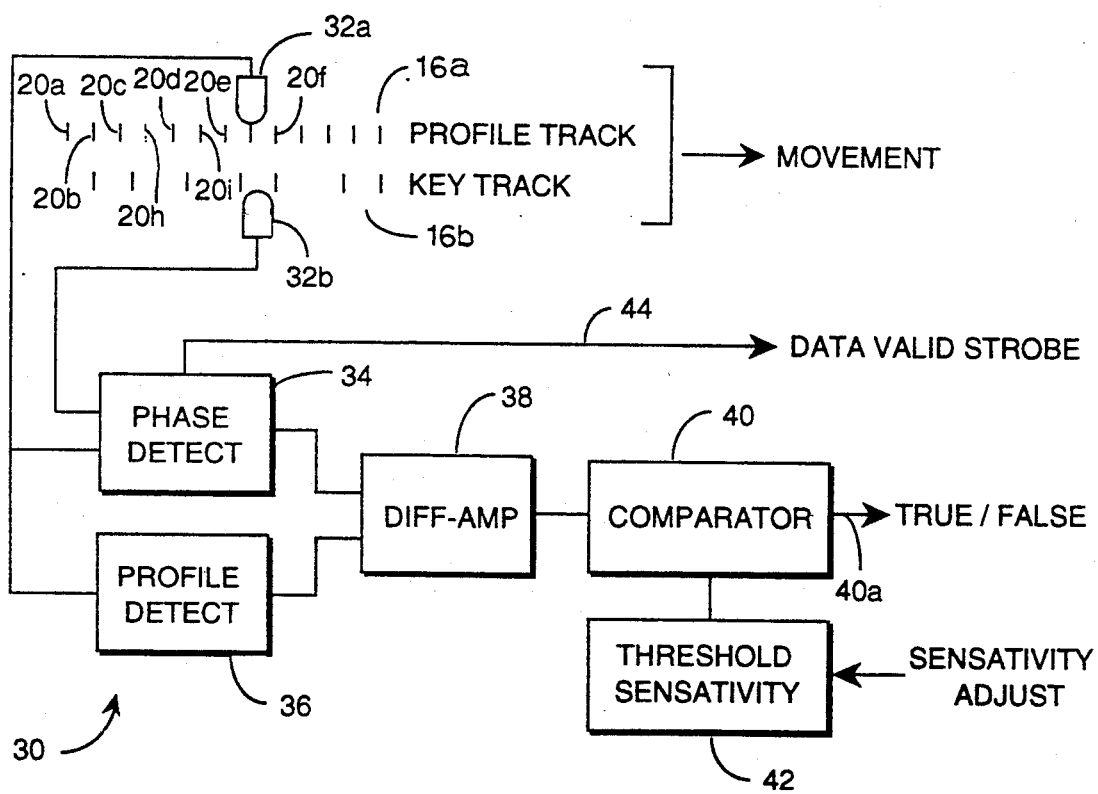
FIG. 3 is a block diagram schematic of a device for verifying a document or a card with a magnetic security system in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 schematically illustrates a portion of a planar object or document 10 which carries one or more magnetic tracks thereon 12, 14, 16a and 16b. Tracks 12 and 14 can be of a type commonly used with magnetically readable and writable documents or cards as are currently known and in general use.

Tracks 16a and 16b, which could be combined together in a single track, represent security tracks which are written onto and read back from in accordance with the present invention. Tracks 16a and 16b are not recorded in standard commercial format.

Track 16a is used to read a unique random magnetic prifle of the document 10. Track 16a is saturation recorded with a square wave at a density on the order of 420 transitions per inch as the object 10 moves past a magnetic write head. Track 16b is used to store an incremental digital or analog representation or key for the sensed profile from track 16a.

FIG. 2A is a graph illustrating an electrical signal which can be read back off of track 16a in response to the saturation recorded square wave. Each of the transitions, such as transitions 20a or 20b represent either a positive going or a negative going transition respectively of the original electrical square wave which was saturation recorded onto track 16a.

The principles of the present magnetic security system are illustrated in FIG. 2A. The peak value of transition 20a is compared to the peak value of a subsequent positive going transition 20c. Because of the known variations in magnetic stripes, no matter how carefully the stripes are created, the peak value of transition 20a will not be the same as the peak value of transition 20c. As illustrated in FIG. 2A, the peak value of transition 20c is greater than the peak value of transition 20a.

Similarly, if transition 20c is compared to transition 20d, as illustrated in FIG. 2A, the peak value of transition 20d is substantially less than the peak value of transition 20c. Similarly, the differences to subsequently sensed pairs of, peak values, such as pairs 20d, 20e; 20e, 20f; and 20f, 20g are considered.

In one embodiment of the present invention the sign and the magnitude of the relative differences in peak value for a given pair of positive transitions can be recorded onto key track 16b, as an incremental representation of the profile on track 16a, as illustrated in FIG. 2B. The negative going transitions recorded and read back from the profile track 16a, such as negative going transition 20b, can be used to clock the information read back from the key track 16b.

For example, marker bits 22a through 22e can be recorded onto the key track 16b with a phase relationship relative to an adjacent negative going transition, such as transition 20h. These bits can be recorded with a sign and a value directly proportional to the difference in adjacent peak values such as the positive going pairs of peak values 20a and 20c.

With respect to FIG. 2B, incremental encoded key element 22a has been encoded onto track 16b with a phase which leads or is in advance of negative going pulse 20h. Similarly, recorded key element 22b which is indicative of a negative going incremental change between the peak values of pulses 20c and 20d has been recorded on the encode track 16b with a negative or lagging phase with respect to negative going pulse 20i.

Other incremental key elements 22c, 22d, and 22e have been recorded on encode track 16b with a phase and displacement relative to associated down going pulses 20j, 20k, 20l, similarly.

It will be understood that an incremental key can be recorded on key track 16b in several alternate ways. For example, only positive going amplitude changes for a given pulse pair which exceed a predetermined threshold need be recorded. Alternately, only negative going amplitude changes that exceed a given threshold need be recorded.

FIG. 3 illustrates schematically a system 30 for reading secured objects such as the object 10 and comparing a newly read profile, off of track 16a, to the recorded and encoded profile on track 16b. The system 30 includes read heads 32a and 32b which are aligned and function to read the information on the tracks 16a and 16b.

Read heads 32a and 32b are each electrically coupled to analog phase detector 34. The read head 32a which reads the profile track is also electrically coupled to analog profile detector 36.

The analog outputs from the phase detector 34 and the profile detector 36 are both coupled as inputs to differential amplifier 38. Output from the differential amplifier 38, the difference between the analog signals from the phase detector 34 and the profile detector 36, is coupled to comparator 40.

A second input to comparator 40 is a sensitivity or a threshold input from element 42. The comparator 40 compares the difference signal from differential amplifier 38 to the adjustable threshold from element 42.

If the magnitude and the phase of the prerecorded key element, such as the element 22a, corresponds to the magnitude and sign of the difference in peak amplitudes between corresponding transitions 20a and 20c, a true signal is generated by comparator 40. In the event of a difference between the newly read profile off of track 16a and the pre-recorded encoded profile from track 16b, the comparator generates a false or error signal as in output.

The element 42 provides a way to adjust the sensitivity of the device 30.

FIG. 4 is a plurality of graphs which illustrates some of the electrical signals associated with the device 30. FIG. 4A is a graph of an output from profile detector 36 is illustrated in response to profile track 16a being read. As illustrated in FIG. 4A, the output from profile detector 36 is an analog output with a sign and magnitude proportional to the differences in peak magnitude of pairs of positive going pulses such as pulses 20a and 20c.

FIG. 4B is a graph of the electrical signals generated by phase detector 34 which also generates an analog output. Finally, FIG. 4C is a graph of electrical signals generated by phase detector 34 on an output data valid line 44. The data valid strobe on the line 44 indicates time intervals when the output signal on line 40a can be sensed.

Thus, the apparatus 30 detects the characteristics of the profile track 16a and compares same to the incremental key recorded on the track 16b making it possible to easily and quickly verify the authenticity of the document or card 10. One particular advantage of the process illustrated in FIG. 2 and the apparatus of FIG. 3 is that a document or card can be authenticated by only reading a portion of the profile track and a portion of the key track. It is unnecessary to read the entire profile track or the entire key track.

FIG. 5 illustrates a flow diagram of the validate process as previously described with respect to the apparatus 30. In a step 50 a first positive going peak value, such as the peak value of the pulse 20a, is sensed and stored. In a step 52 the peak value of a second positive going pulse, such as the pulse 20c, is sensed and stored.

In a step 54 the first and second previously read and stored peak values are subtracted from one another. In a step 56 a negative going pulse, such as the pulse 20h, is detected.

In a step 58 a key element, such as key element 22a or 22b, is detected and the sign of the phase of that element relative to the respective negative going pulse, such as pulse 20h, is compared to the previously set mask indicating the sign of the difference between peak values of adjacent pulses such as pulses 20a and 20c. In a step 60 the signal on the data valid line is set and an appropriate output is generated on the compare output line 40a.

Finally, in step 62 the previously read second peak positive going value, such as the pulse 20c, is moved in to the first storage location and the process repeats.

Figure 6:
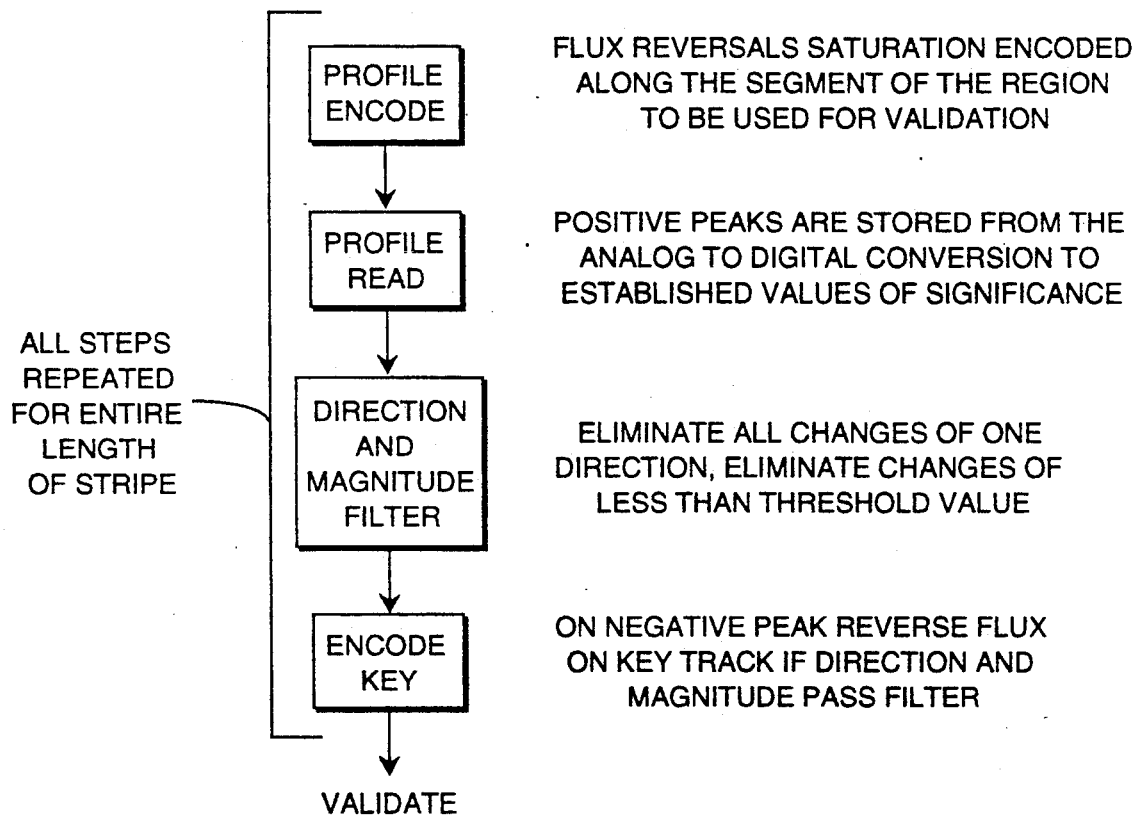
FIG. 6 is a flow diagram of a method of encoding a document or a card with an incremental key in accordance with the present invention.

FIG. 6 illustrates the steps of a process for encoding incremental key elements onto the track 16b in response to reading the profile track 16a.

While the system 30 and related method have been disclosed and described in connection with a randomly varying magnetic security system, the principles hereof are applicable to other types of randomly varying security characteristics. For example, other applicable types of regions include translucency or reflectance variations of documents. Still others include random variations in print locations or thickness profiles of documents.

FIG. 7 illustrates an alternate, digital, system 70 usable to read profile tracks of the type 16a, as well as incremental key tracks such as the track 16b and generate a validity indication for the corresponding document. The system 70 includes readheads 72 and 74 for respectively sensing the random characteristic of the profile track 16a as well as the prerecorded incremental key track 16b. Outputs from each of the readheads 72 and 74 are respectively coupled to operational amplifiers 72a and 74a.

Output from the amplifier 72a, on a line 72b, is a representation of the sensed random magnetic characteristic of the profile track 16a. A graphical representation of the amplified signal on the line 72b is illustrated in FIG. 8A as a functional time. Output from the amplifier 74a, on a line 74b, a representation of the prerecorded incremental key from the track 16b is illustrated in FIG. 8D as a function of time.

Profile signals on the line 72b are coupled to peak detect circuitry 76. Output from peak detect circuitry 76 on lines 76a and 76b represents peak values of pairs of positive going profile signals such as the signals 78a and 78b of FIG. 8a. Output on the line 78a is temporarily stored in sample and hold amplifier 80a. Output on the line 76b is temporarily stored in and hold amplifier 80b.

The peak value from pulse 78a, from amplifier 80a is subtracted from peak value of pulse 78b held in amplifier 80b in an adder 82. The difference between from amplifiers 80a and 80b is compared in a comparator 84 to an adjustable threshold to determine whether or not the difference exceeds a preset minimum. Output from comparator 84 on a line 84a is illustrated in graphical form in graph FIG. 8F.

Subsequent to comparing the pair of peak values for the signal 78a and 78b, the peak detect circuitry 76 in combination with sequence control logic 86 then compares the pair of peak pulse values corresponding to the pulses 78b and 78c.

All subsequent pairs of pulses on the profile rack 16a are sensed accordingly.

Signals representative of the incremental key indicators recorded on the track 16b, on the line 74b, provide inputs to key detect circuitry 86. Output from key detect circuitry 86 on the line 86a corresponds to a positive going pulse in the presence of a sensed, prerecorded, key symbol as illustrated in the graph of FIG. 8e.

Clock recovery circuitry 88 generates a comparison window positive going signal on a line 88a as illustrated in the graph of FIG. 8C in response to negative going edges of the profile track signals on the line 72b. Clock recovery circuitry 88 also generates positive going data strobe pulses on a line 88b corresponding to the pulse train of FIG. 8B.

The signals on the lines 84a, 88a and 88b provide inputs to the Key and Profile Compare circuitry 90. Key and Profile Compare circuitry 90 generates a zero on an output line 90a as represented by the wave form of the graph of FIG. 8G where the comparison between the most recently read pair of signals off of the profile track differs from the signal read off of the incremental key track of FIG. 16b. The data valid strobe output on the line 88b is usable for purposes of strobing the output on the line 90a.

Figure 10A:
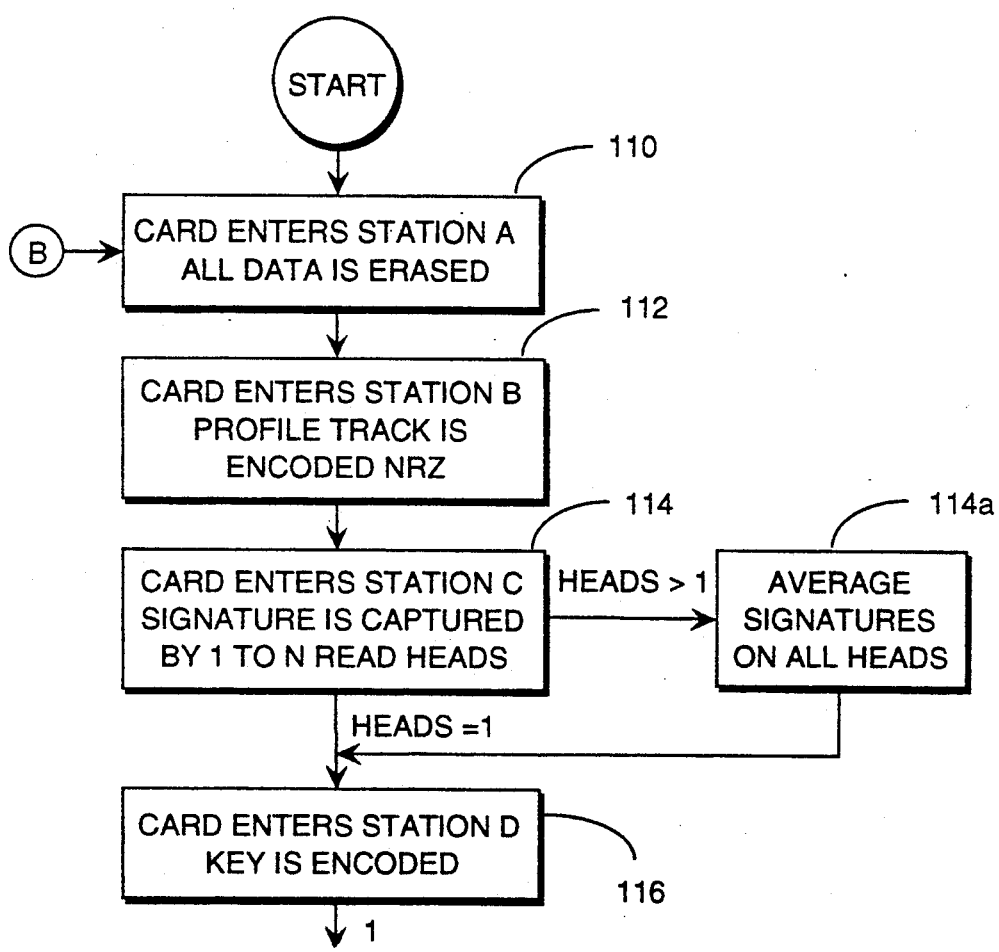
FIGS. 10A–10C taken together are a flow diagram illustrating a method of operation of the apparatus of FIG. 9.

FIG. 9 illustrates schematically an apparatus 100 for reading profile tracks, such as the track 16a and then generating and writing incremental key representations on the track 16b. The flow diagram of FIGS. 10A, 10B and 10C taken together depict a method of reading the profile track off of a card, such as the card 102 and writing onto the incremental key track thereof using the apparatus 100.

In a step 110, the card 102 to be encoded, enters station A and is erased. The card 102 then enters station B in a step 112 and the profile track is written with a predetermined random characteristic enhancing electrical signal, such as a saturation recorded square wave.

The card 102 then enters station C in a step 114 and the enhanced random magnetic characteristic of the profile track, such as the track 16a, is read or captured by one or more read heads. In a step 114a, the recorded analog signatures sensed by a plurality of parallel heads are averaged.

In a step 116, the card 102 enters the write station D and the incremental key, based on having read the entire profile track, is generated and written onto the key track.

Figure 10B:
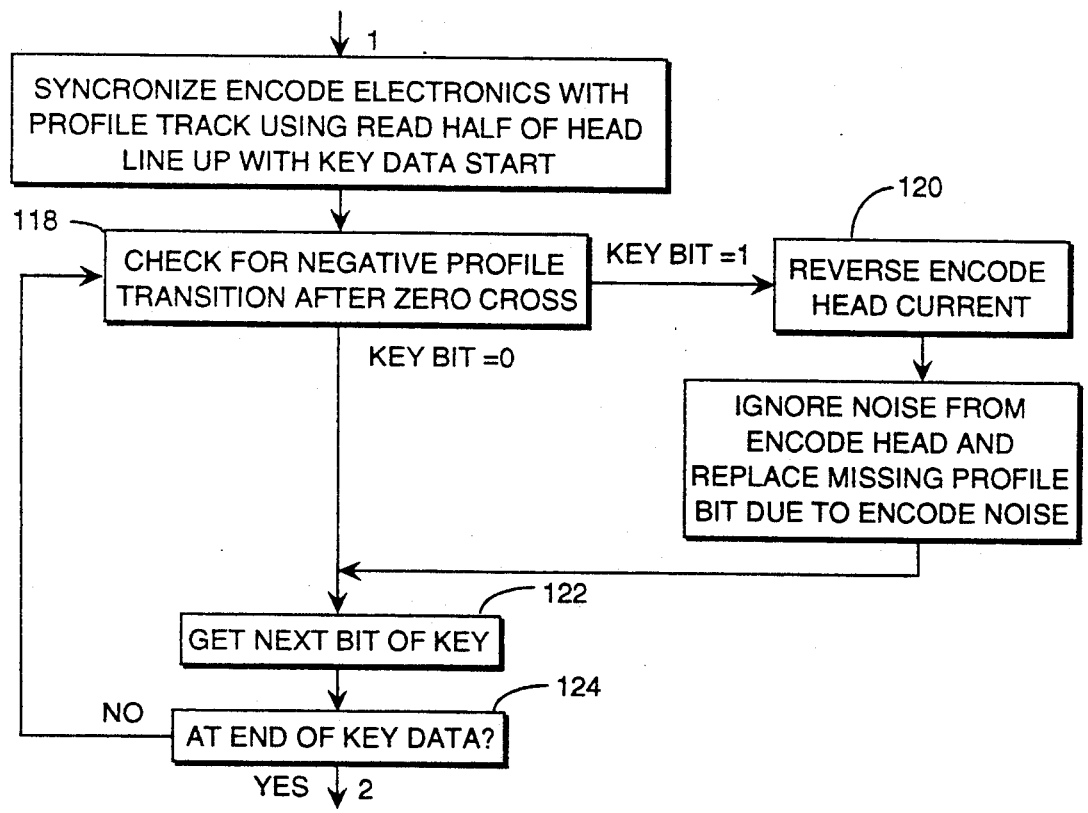

FIG. 10B represents the steps of the apparatus of station D in writing the incremental key onto the key track such as the key track 16b. In a step 118, the representation of the incremental key to be written is synchronized with a negative going transmission off of the profile track. If the key bit is a logical one a representation thereof as written onto the key track in a step 120.

In a step 122, the next generated bit of the incremental key is retrieved from storage and the process of step 118 is repeated. When the end of key data is sensed in a step 124, the card 102 then enters verified station E of the apparatus 100.

Figure 10C:
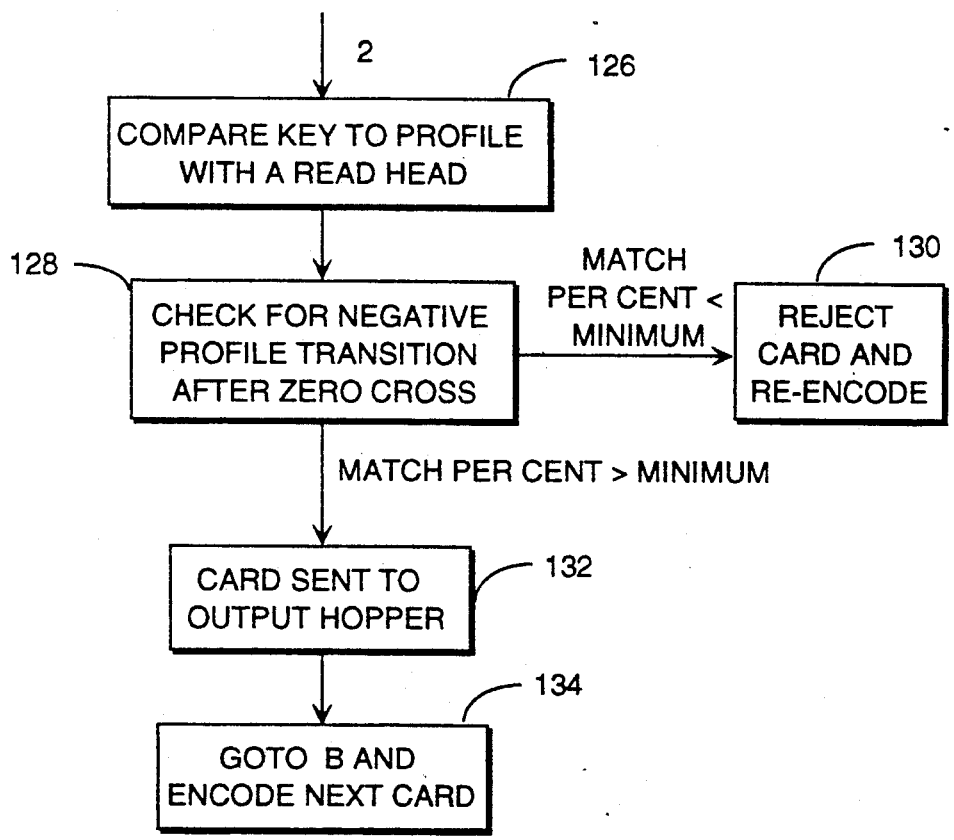

The flow diagram of FIG. 10C illustrates the steps in a method executed by the apparatus of station E to verify that the key which has been written onto the card 102 corresponds to the sensed profile in a step 126. If the recorded key does not match the newly read profile, as sensed in a step 128, to an extent which exceeds a predetermined threshold, the card is rejected in a step 130. If the newly sensed profile patches the prerecorded key to an extent exceeding the prerecorded threshold, the card is accepted in a step 132 and the process is re-initiated in a step 134 with a new card.

The above described digital system and method are also usable, with appropriate sensors, with a variable translucence or reflectance optical security system. It is also usable with other types of randomly variable characteristics.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. A method of creating an incremental security profile of a randomly varying characteristic of an object comprising:
   (a) sensing first and second values of a parameter of the characteristic;
   (b) generating an incremental indicium indicative of a difference between only the two values;
   (c) recording the incremental indicium; and repeating steps (a)–(c).

2. A method as in claim 1 with the generating step including forming an indicium that includes an algebraic sign of the difference.

3. A method as in claim 1 including generating a plurality of indicia with at least some of the indicia including both an algebraic sign and a representation of a difference between only two respective random characteristic values.

4. A method as in claim 1 including, in step (c), writing a representation of the incremental indicium onto the object.

5. A method as in claim 1 including writing a plurality of representations of incremental indicia onto the object.

6. A method as in claim 1 including, in step (c), forming a displacement related representation of the indicium prior to recording.

7. A method as in claim 1 with the randomly varying characteristic that of a magnetic region and including writing a characteristic enhancing discontinuous digital signal onto the magnetic region.

8. A method as in claim 7 with step (c) including writing the incremental indicia onto a portion of the magnetic region.

9. A method as in claim 7 with step (c) including writing the incremental indicia onto the object.

10. A method as in claim 7 with step (c) including storing the indicia at a location remote from the object.

11. A method as in claim 1 with the randomly varying characteristic the translucency of a portion of the object.

12. A method as in claim 1 with the randomly varying characteristic the reflectance of a portion of the object.

13. A method as in claim 1 with the sensed parameter values corresponding to amplitudes representative of the random characteristic and with the generated indicium of step (b) including an algebraic sign of a difference between first and second amplitude values.

14. A method as in claim 13 with the generated indicium including in addition a representation of the amplitude difference.

15. A method as in claim 1 with the indicium recorded only when corresponding to a selected algebraic sign.

16. A method as in claim 1 with the generated indicium recorded on the object as a displacement relative to a respective base line.

17. An apparatus for creation of an incremental profile of a randomly varying verification characteristic of an object comprising:

means for sensing values of a selected parameter of the characteristic;
means for sequentially creating a plurality of indicia with each indicium representative of an incremental difference between selected first and second values of the parameter of the characteristic; and
means for recording some of said indicia after creation.

18. An apparatus as in claim 17 with the verification characteristic carried by a magnetic region on the object and wherein said sensing means includes means for reading the magnetic region.

19. An apparatus as in claim 17 with the verification characteristic carried in a translucent region of the object and with the apparatus including means for detecting translucency of the region.

20. An apparatus as in claim 17 including means, coupled to said recording means, for selecting those indicia to be recorded.

21. An apparatus as in claim 20 with each said indicium including at least a representation of an algebraic sign representative of said incremental difference and with said selecting means including means for enabling recording of only indicia corresponding to a selected algebraic sign.

22. An apparatus as in claim 17 with said recording means including means for generating displacements relative to a base line with said displacement representative of respective ones of said series of indicia.

23. An apparatus as in claim 22 including means for writing representations of at least selected of said displacements onto the object.

24. An apparatus as in claim 23 with said writing means including a printer.

25. An apparatus as in claim 23 with said writing means including a magnetic write head.

26. An apparatus as in claim 17 with said creating means including means for forming an amplitude difference between first and second values of the parameter.

27. A verifiable object comprising:
a base;
a unique, randomly variable measurable characteristic carried by said base;
a relative, incremental representation of said characteristic extending along said base as a plurality of spaced apart indicia with each said indicium including a representation of a difference between selected first and second values of a parameter of said characteristic.

28. A verifiable object as in claim 27 with at least some of said indicia including a representation of an algebraic sign of said difference.

29. A verifiable object as in claim 28 with said indicia including a representation of only an algebraic sign.

30. A verifiable object as in claim 27 with at least some of said indicia including a value corresponding to a difference between first and second amplitude values of said characteristic.

31. A verifiable object as in claim 27 including a magnetic region on said base, said magnetic region including said randomly variable, measurable characteristic.

32. A verifiable object as in claim 27 including a radiant energy transmissive region on said base with said transmissive region including said randomly variable, measurable characteristic.

33. A verifiable object as in claim 27 including a region, at least in part reflective of radiant energy, on said base with said reflective region including said randomly variable, measurable characteristic.

34. A verifiable object as in claim 27 including a recordable magnetic region with said spacedapart indicia recorded thereon.

35. A verifiable object as in claim 27 with representations of said spaced apart indicia printed thereon.

36. A verifiable object as in claim 27 including means for enhancing said measurable characteristic.

37. A verifiable object as in claim 31 including a predetermined characteristic enhancing electrical signal written onto said magnetic region.

38. A verifiable object as in claim 37 with said enhancing electrical signal a saturation recorded, discontinuous, multi-valued signal.

39. A verifiable object as in claim 27 with each said indicium carried on said base as a machine readable displacement relative to a respective base line.

40. A verifiable object as in claim 27 with each said parameter value corresponding to an amplitude value of said randoml variable characteristic.

41. A verifiable object as in claim 40 with at least some of said indicia including an algebraic sign of a corresponding amplitude difference.

42. An object which carries an incremental verification key usable for verification of an available part of the object, the object comprising:
a base;
a unique, randomly variable measurable characteristic extending along a region of and carried by said base;
an incremental, distributed, verification key extending along a second region of and carried by said base with a subset of said key, contained within the part of the object and combinable with an associated subsection of said region for verification of the part of the object.

43. An object as in claim 42 with said key including a plurality of indicia distributed in said second region with each said indicium including a representation of a difference between first and second values of a parameter of said characteristic.

44. An object as in claim 42 with a magnetic region carried on said base with said magnetic region containing said randomly variable characteristic.

45. An object as in claim 44 with said magnetic region being at least in part, recordable.

46. An object as in claim 42 with a magnetic region carried on said base and with said second region contained therein.

47. An object as in claim 46 with said randomly variable characteristic contained in said magnetic region.

48. An object as in claim 42 with a translucent region carried on said base and containing said randomly variable characteristic.

49. An object as in claim 42 with a reflective region carried on said base and containing said randomly variable characteristic.

50. An object as in claim 43 with said representation carried by said base as a displacement with respect to a selected reference.

51. An object as in claim 42 with said measurable characteristic extending in an arcuate region.

52. An object which carries a distributed verification key with a subpart of the object carrying a subset of the verification key, the subpart being independently verifiable, the object comprising:
a base;
a unique randomly variable measurable characteristic extending along a region of and carried by said base with a part of said region extending into a subpart of said base; and
a distributed verification key formed of a plurality of indicia extending along a second region, extensive with said region, carried by said base with a portion of said plurality contained within said subpart of said base, said part of said region being detectable and combinable with said portion of said plurality for verification of the subpart of the object.

53. An object as in claim 52 with each said indicium including a representation of a difference between first and second values of a parameter of said characteristic.

54. An object as in claim 53 with each said parameter value an amplitude value of said random characteristic.

55. An object as in claim 52 with at least some of said indicia including an algebraic sign of an amplitude difference between first and second amplitude values of said random characteristic.

56. An object as in claim 52 with a magnetic region carried on said base with said magnetic region containing said randomly variable characteristic.

57. An object as in claim 56 with said magnetic region being at least in part, recordable.

58. An object as in claim 52 with a magnetic region carried on said base and with said second region contained therein.

59. An object as in claim 58 with said randomly variable characteristic contained in said magnetic region.

60. An object as in claim 52 with said second region extending substantially equidistant from said region.

61. An object as in claim 52 with said verification key extending in a curved region.

62. An apparatus for validating an object which carries a unique, randomly variable measurable characteristic which extends along a region thereof and which also carries an incremental verification key, formed of a plurality of spaced apart indicia, which extends along a second region thereof, the apparatus comprising:
a first sensor for detecting peak values of said randomly variable characteristic;
circuitry for processing pairs of the detected peak values;
a second sensor for detecting at least some of said indicia;
circuitry for comparing processed, detected, pairs of peak values to corresponding of said indicia; and
circuitry for generating a validity indicium in response to said comparison.

63. An apparatus as in claim 62 with said processing circuitry including means for forming differences between pairs of detected peak values.

64. An apparatus as in claim 63 including further means for forming a plurality of algebraic signs with each sign associated with a respective formed difference.

65. An apparatus as in claim 62 with said second detecting sensor including means for sensing displacement relative to a respective reference.

66. An apparatus as in claim 62 with the randomly variable characteristic extending in a curved region and with said first sensor operative along said curved region.

67. A method of validating an object which carries a unique, randomly variable, measurable characteristic which extends along a region thereof and which also carries an incremental verification key formed of a plurality of spaced apart indicia which indicia extend along a second region thereof, the method comprising:

detecting peak amplitude values of the randomly variable characteristic;

processing the detected peak amplitude values;

detecting displacement relationships between some of the verification indicia and respective base indicators associated therewith;

comparing the processed, detected peak amplitude values to corresponding of the displacement relationships; and generating a validity indicium in response to said comparison.

68. A method as in claim 67 with the processing step including forming a difference between first and second peak amplitude values.

69. A method as in claim 67 with the processing step including forming an algebraic sign of a difference between first and second peak amplitude values.

70. A method of creating an incremental profile of a randomly varying characteristic of an object comprising:

(a) sensing first and second amplitude values of a parameter of the characteristic;

(b) generating an incremental indicium based on a difference between amplitudes of only the two values;

(c) recording the incremental indicium; and repeating steps (a)-(c).

71. A method as in claim 70 with the generating step including forming an indicium with an algebraic sign of the difference.

72. A method as in claim 70 including generating a plurality of indicia with at least some of said indicia including both an algebraic sign and a representation of an amplitude difference between only two respective random characteristic values.

73. An apparatus for creation of an incremental profile of a randomly varying verification characteristic of an object comprising:

means for sensing amplitude values of a selected parameter of the characteristic;

means for sequentially creating a series of indicia with each indicium representative of a difference between respective first and second amplitude values of the characteristic; and means for recording each said indicium on the object.

74. An apparatus for validating an object which carries a unique, randomly variable measurable characteristic which extends along a region thereof and which also carries an incremental verification key, formed of a plurality of spaced apart indicia, which extends along a second region thereof, the apparatus comprising:

a first sensor for detecting peak values the randomly variable characteristic;

a device for processing the detected peak values;

a second sensor for detecting relationships between some of the indicia and a respective reference;

a comparator for comparing processed, detected, peak values to corresponding of said detected relationships; and an indicator for generating a validity indicium in response to said comparison.

75. An apparatus as in claim 74 with said processing device including an arithmetic unit for forming differences between pairs of detected pea values.

76. An apparatus as in claim 75 including circuitry for forming a plurality of algebraic signs with each sign associated with a respective formed difference.

77. An apparatus as in claim 74 with said second sensor including means for sensing displacement relative to the respective reference.

78. An apparatus as in claim 74 with the randomly variable characteristic extending in a curved region and with said first sensor operative along said curved region.

79. An apparatus as in claim 74 with said first sensor including a magnetic read head.

80. An apparatus as in claim 74 with said second sensor including an optical detector.

81. An apparatus as in claim 74 with said processing device including a programmed computer.

82. An apparatus as in claim 81 with said programmed computer including said comparator.

83. An apparatus as in claim 81 with said programmed computer including said validity indicium generating indicator.

84. An apparatus as in claim 81 with said programmed computer including an arithmetic unit for forming differences between pairs of detected peak values.

* * * * *

UNITED STATES PATENT AND TRADEMARK OFFICE
CERTIFICATE OF CORRECTION

PATENT NO. : 5,216,229
DATED : June 1, 1993
INVENTOR(S) : Robert A. Copella and Kevin J. Pease It is certified that error appears in the above-indentified patent and that said Letters Patent is hereby corrected as shown below:

Column 5, line 4, "prifle" should be --profile--;
        line 59, "20I" should be --20l-- [20 lower case el].

Column 7, line 46, after "in" insert --sample--;
        line 49, after "between" insert --the signals--.

Column 8, line 60, "patches" should be --matches--.

Column 11, line 4, "spacedapart" should be --spaced-apart--;
        line 21, "randoml" should be --randomly--.

Column 14, line 8, after "values" insert --of--;
        line 20, "pea" should be --peak--.

Signed and Sealed this

Twenty-fifth Day of January, 1994

Attest:

BRUCE LEHMAN

*Attesting Officer*      *Commissioner of Patents and Trademarks*